United States Patent [19]
Uhrig

[15] 3,706,994
[45] Dec. 19, 1972

[54] AUTOMATIC CONFIDENCE TEST FOR ECM REPEATER
[72] Inventor: Edward O. Uhrig, Ellicott City, Md.
[73] Assignee: The United States of America as represented by the Secretary of the Air Force
[22] Filed: Oct. 1, 1970
[21] Appl. No.: 77,161

[52] U.S. Cl. ................................ 343/17.7, 343/18 E
[51] Int. Cl. .................................................. G01s 7/40
[58] Field of Search ........................... 343/17.7, 18 E

[56] References Cited
UNITED STATES PATENTS
2,775,759   12/1956   Okrent ................................ 343/17.7
3,035,229   5/1962    Guderian et al. ................... 343/17.7

Primary Examiner—Benjamin A. Borchelt
Assistant Examiner—G. E. Montone
Attorney—Harry A. Herbert, Jr. and George Fine

[57] ABSTRACT

An apparatus for automatically testing a repeater type ECM system by inducing a condition whereby the system gain exceeds the antenna isolation to provide a gross level system confidence test simultaneous to normal operation due to the very low duty cycle of the test.

3 Claims, 2 Drawing Figures

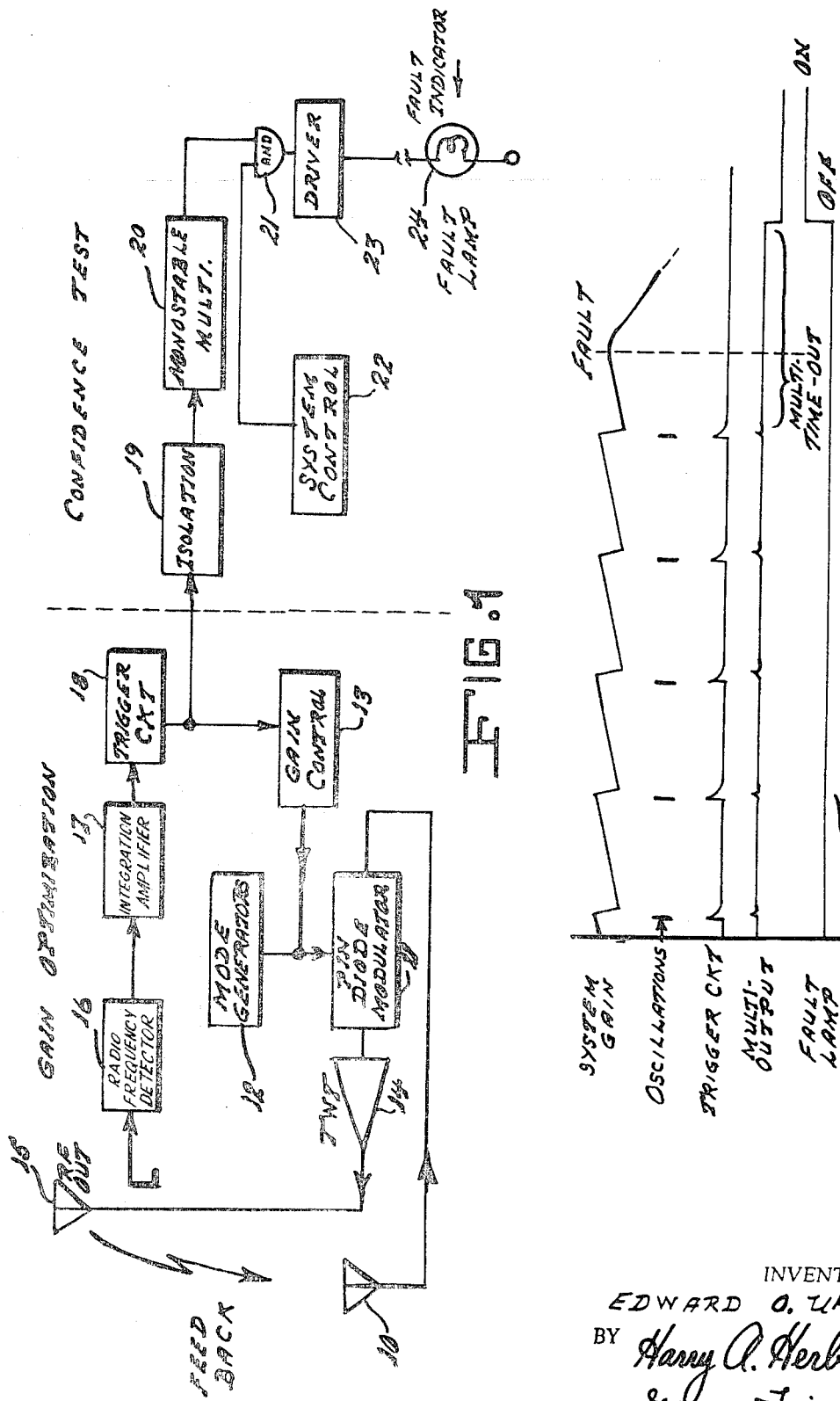

AUTOMATIC CONFIDENCE TEST FOR ECM REPEATER

BACKGROUND OF THE INVENTION

The present invention relates broadly to an automatic confidence test apparatus for an ECM repeater system and in particular to apparatus to perform a system confidence test during normal system operation in radar jammer.

When ECM systems such as the QRC-335 type system were employed successfully in the field, the need was felt for a confidence or self test capability which could be performed during normal system operation. Many of the prior art confidence test apparatus were limited to use in pulse type ECM systems. The concepts which were utilized in testing pulse type ECM systems were not applicable in testing CW type ECM systems. Since the ECM equipment is extremely important to aircraft survival, the urgent need exists for a confidence test system which would inform the pilot or operator automatically when a malfunction occurred and which would operate in a CW type system during normal system operation.

The prior art apparatus for testing ECM systems would not be operative during the repeater mode during which the R.F. detection is gated off since the signal level is unknown and will frequently be below saturation. Therefore, the most important mode of operation, the repeater mode, would not be tested and thus, the confidence test would not be complete. Other prior art apparatus was limited to individual test components which were used to test various separate portions of the ECM system. Thus it may be seen that the overall system gain, output cables, antennas or input R.F. circuitry are not checked or tested.

SUMMARY OF THE INVENTION

The present invention utilizes an automatic confidence or self test circuit which is coupled to the gain optimization circuit of an ECM warning radar. The confidence circuit comprises an isolation circuit, a monostable multivibrator, an "and" gate and driver circuit, and a fault lamp. Each time the gain optimization trigger circuit generates a pulse the monostable multivibrator is recharged to hold it up. In the event the trigger pulse should fail to occur, the multivibrator would time out, switch and activate the driver circuit to display a fault on the fault lamp.

It is one object of the invention, therefore, to provide an improved automatic confidence test apparatus for an ECM repeater system utilizing the excess system gain over antenna isolation to induce oscillation which provides an overall system check.

It is another object of the invention to provide an improved automatic confidence test apparatus having a periodic test at a low duty cycle to frequently test the ECM system during normal operation with negligible interference to system operation.

It is yet another object of the invention to provide an automatic confidence test apparatus having an overall type confidence test which checks antennas, input and output R.F. circuitry, in addition to the critical R.F. amplifiers and associated power supplies.

It is still another object of the invention to provide an automatic confidence test apparatus having low complexity, size and cost while providing a high level of confidence test.

These and other advantages, features and objects of the invention will become more apparent from the following description taken in connection with the illustrative embodiment in the accompanying drawing.

DESCRIPTION OF DRAWING

FIG. 1 is a block diagram of the automatic confidence test apparatus in accordance with this invention; and, FIG. 2 is a graphic representation of the confidence test apparatus circuit waveforms.

DESCRIPTION OF PREFERRED EMBODIMENT

Referring now to FIG. 1, a block diagram of the preferred embodiment of the automatic confidence test apparatus is shown. The gain optimization circuit of an ECM system comprises an input antenna 10 which is connected to the Pin diode modulator 11, to receive the enemy radar transmission. The Pin diode modulator 11 receives input signals from both the mode generators 12 and the gain control unit 13. The traveling wave tube (TWT) 14 receives the output signal from Pin diode modulator 11 and supplies output antenna 15 with radar information which is to be transmitted back to the enemy radar installation. A portion of the radar information is coupled from output antenna 15 and applied to R.F. detector 16. The output signal from R.F. detector 16 is supplied to integration amplifier 17. The integrated output signal from amplifier 17 is applied to trigger circuit 18 which in turn supplies an output signal to the gain control unit 13. A portion of the output signal from trigger circuit 18 is applied to isolation circuit 19 which couples the automatic confidence test apparatus to the gain optimization circuit. The signal derived from the trigger circuit 18 is applied by isolation unit 19 to monostable multivibrator 20. And gate 21 receives input signals from multivibrator 20 and system control unit 22. The output of the and gate 21 is applied through driver 23 to fault lamp 24. Fault lamp 24 may be and generally is located at a remote position relative to the confidence test apparatus in order to warn the pilot or the operator of the apparatus that a fault condition exists within the ECM system.

In order to achieve an overall high confidence level test, the system feedback is utilized between the output antenna 15 and the input antenna 10 to check the overall system gain by introducing conditions which cause the system to oscillate. The gain optimization circuit operates so that the gain is slowly increased until oscillation is detected at which point the gain is rapidly reduced to below the level at which the oscillation occurred. In this manner the average gain level is maintained just below the oscillation level thereby the period of oscillation is extremely low compared to the non-oscillating level period. By coupling the confidence test apparatus to the gain optimization circuit it is possible to provide a confidence test for all modes of ECM system operation including the repeater mode. When an oscillation occurs in the gain optimization circuit, the trigger circuit 18 is tripped. The monostable multivibrator 20 has a greater period than the inter-oscillation period of the gain optimization circuit. The operation of the monostable multivibrator 20 is such that each time the gain optimization trigger circuit 18 generates a pulse, the monostable multivibrator 20 is recharged to hold it up. In the event the trigger pulse should fail to occur the multivibrator 20 would time out, "and" gate 21 would react to the pulse change and trigger driver circuit 23 to display a fault condition on fault lamp 24. A timing diagram showing the pertinent waveforms of the above described circuit operation is presented in FIG. 2. The use of a periodic test at a low duty cycle will allow frequent testing of the ECM system in all modes including the repeater mode with negligible interference with the jamming operation against enemy radar and will achieve a confidence test when it is most desirable. The confidence test will provide a high level of confidence since the entire RF chain, power supplies and antennas must be operating in a normal fashion in order to provide the proper trigger signals out of the gain optimization circuit.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. An automatic confidence test apparatus for electronic countermeasures systems comprising in combination:

A gain optimization circuit utilizing the excess system gain over antenna isolation to induce oscillation, said oscillations providing pulses within said gain optimization circuit, An isolation circuit connected to said gain optimization circuit to receive said pulses, A monostable multivibrator connected to said isolation circuit to receive said pulses, said multivibrator being recharged by said pulses to provide an output signal, An And gate and driver circuit connected to said multivibrator, said And gate and driver circuit providing an output signal when said output signal from said multivibrator changes; and, A fault indicator connected to said And gate and driver circuit to provide a visual indication.

2. An automatic confidence test apparatus as described in claim 1 wherein said monostable multivibrator has a period greater than the oscillation period of said gain optimization circuit.

3. An automatic confidence test apparatus as described in claim 1 wherein said gain optimization circuit periodically tests the electronic countermeasures system at a low duty cycle during normal system operation.

* * * * *